US007024553B1

United States Patent
Morimoto (10) Patent No.: US 7,024,553 B1
(45) Date of Patent: Apr. 4, 2006

(54) SYSTEM AND METHOD FOR UPDATING ENCRYPTION KEY FOR WIRELESS LAN

(75) Inventor: Shinichi Morimoto, Tokyo (JP)

(73) Assignee: NEC Corporation, (JP)

( * ) Notice: Subject to any disclaimer, the term of this patent is extended or adjusted under 35 U.S.C. 154(b) by 719 days.

(21) Appl. No.: 09/677,968

(22) Filed: Oct. 3, 2000

(30) Foreign Application Priority Data

Oct. 7, 1999 (JP) ................................. 11-287262

(51) Int. Cl.
*H04L 9/00* (2006.01)

(52) U.S. Cl. ...................... 713/163; 380/273; 380/277; 380/278

(58) Field of Classification Search ................ 380/273, 380/277, 278; 713/163
See application file for complete search history.

(56) References Cited

U.S. PATENT DOCUMENTS

| 6,215,877 | B1 * | 4/2001 | Matsumoto ................. 380/277 |
| 6,263,435 | B1 * | 7/2001 | Dondeti et al. .............. 713/163 |
| 6,295,361 | B1 * | 9/2001 | Kadansky et al. ........... 380/278 |
| 6,711,264 | B1 * | 3/2004 | Matsumoto et al. ......... 380/283 |

FOREIGN PATENT DOCUMENTS

| JP | 6-237249 | | 8/1994 |
| JP | 10-336745 | | 12/1998 |
| JP | 11085014 | A * | 3/1999 |
| JP | 11-196081 | | 7/1999 |

OTHER PUBLICATIONS

Marc Farley, Tom Sterans, and Jeffrey Hsu, LAN Times Guide to Security and Data Integrity, 1996, Osborne McGraw-Hill, pp. 218-221 and 285-286.*
The American Heritage College Dictionary, 2002, Houghton Mifflin Company, Fourth Edition, p. 1072.*
"Authentication and Privacy", Local and Metropolitan Area Networks Wireless LAN, *IEEE P802.11/D10*, Jan. 14, 1999, pp. 60-70.
Japanese Office Action issued Dec. 16, 2003 (w/ English translation of relevant portions).
Lakshminath R. Dondeti, et al., "Comparison of Scalable Key Distribution Schemes for Secure Group Communication," Global Internet: Application and Technology, Globecom '99, pp. 1774-1778.
Japanese Office Action issued Mar. 16, 2004 (w/ English translation of relevant portions).

* cited by examiner

Primary Examiner—Gregory Morse
Assistant Examiner—Jacob Lipman
(74) *Attorney, Agent, or Firm*—Dickstein, Shapiro, Morin & Oshinsky, LLP.

(57) ABSTRACT

System for updating an encrypted key, by means of which the WEP of IEEE 802.11 can be applied to a wireless LAN system having plural APs and a large number of STAs. A key management server is LAN-connected to the APs. A set of plural (k) encrypted keys used for wireless communication between the entire APs and STAs is provided and managed monistically. If an encrypted key is updated in the key management server, the updated key is delivered to each of the APs and the STAs.

21 Claims, 7 Drawing Sheets

SYSTEM AND METHOD FOR UPDATING ENCRYPTION KEY FOR WIRELESS LAN

FIELD OF THE INVENTION

This invention relates to a wireless LAN system for wireless (or radio) communication on data encryption. More particularly, it relates to a system and a method for encrypted key updating in a wireless LAN system employing encryption by a WEP mechanism.

BACKGROUND OF THE INVENTION

UP to now, protection of communication data, that is security in wireless accessing, has been desired with the coming into widespread use of the wireless LAN system.

Recently, introduction of the wireless LAN system is going on not only for outdoor use but also for indoor use. For example, there are many instances in which an access point (AP or fixed base station) is installed in precincts and transmission/reception devices or access terminal devices termed generally "station" (STA) are connected to terminal devices provided on a floor to provide a wireless route connecting to the AP to provide for facilitated positional change of the terminal devices as well as to improve convenience in carrying out of doors and returning of portable terminal devices.

In such a system, communication data needs to be protected against the portable wireless terminal devices carried by a visitor from outside or against external wireless terminal devices that is able to intercept electrical waves tending to leak to an outdoor side.

As a data protection system in wireless communication, one exploiting encryption is becoming widespread. In the encryption system in the wireless communication system, researches for standardization have so far been conducted by IEEE.

At the current stage, the shared key encryption (common key) system, employing the WEP (Wired Equivalent Privacy algorithm) mechanism is adopted in IEEE 802.11 as an encryption and authentication system for the wireless section (or domain).

Figure 6:
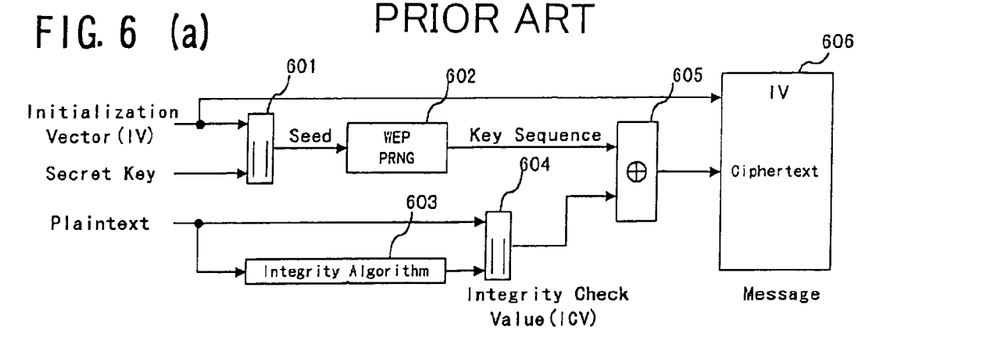
FIG. 6 is a block diagram for illustrating an encipherment system in the conventional technique by WEP of IEEE 802.11.

FIG. 6a is a block diagram showing an encryption (encipherment) system by the WEP mechanism as described in chapter 8.2.3 of IEEE 802.11, and FIG. 6b is a block diagram similarly showing a deencryption (decipherment) system.

Referring to FIG. 6a, the encryption system by the WEP mechanism is made up of a seed generating unit 601, encryption unit 602, error detection code generating unit (Integrity Algorithm) 603, error detection code appending unit 604 and ciphered text generating processing unit 605, and outputs an encrypted message 606. The encryption unit 602 is constituted by an RC4 algorithm.

The operation of FIG. 6a is described in IEEE 802.11 draft and hence is not explained specifically. The encipherment system of FIG. 6a is fed with an initialization vector (IV), a secret key and communication data (Plaintext) and outputs a ciphered text (Ciphertext).

The decipherment system by the WEP mechanism, shown in FIG. 6b, is made up of seed generating means 611, encryption unit 612, deencryption processing unit 613, code separation unit 614, error detection code generating unit 615 and error detection code comparator 616. The encryption unit 612 is comprised of an RC4 algorithm.

The decipherment system of FIG. 6b is fed with IV and the ciphered text from the received encrypted message (Ciphertext) 606 and performs decipherment processing using a memorized encrypted key. As a result, the deciphered plain text (Plaintext) and the results of comparison of the error detect ion code termed "Integrity Check Value" (ICV) are output.

Figure 7:
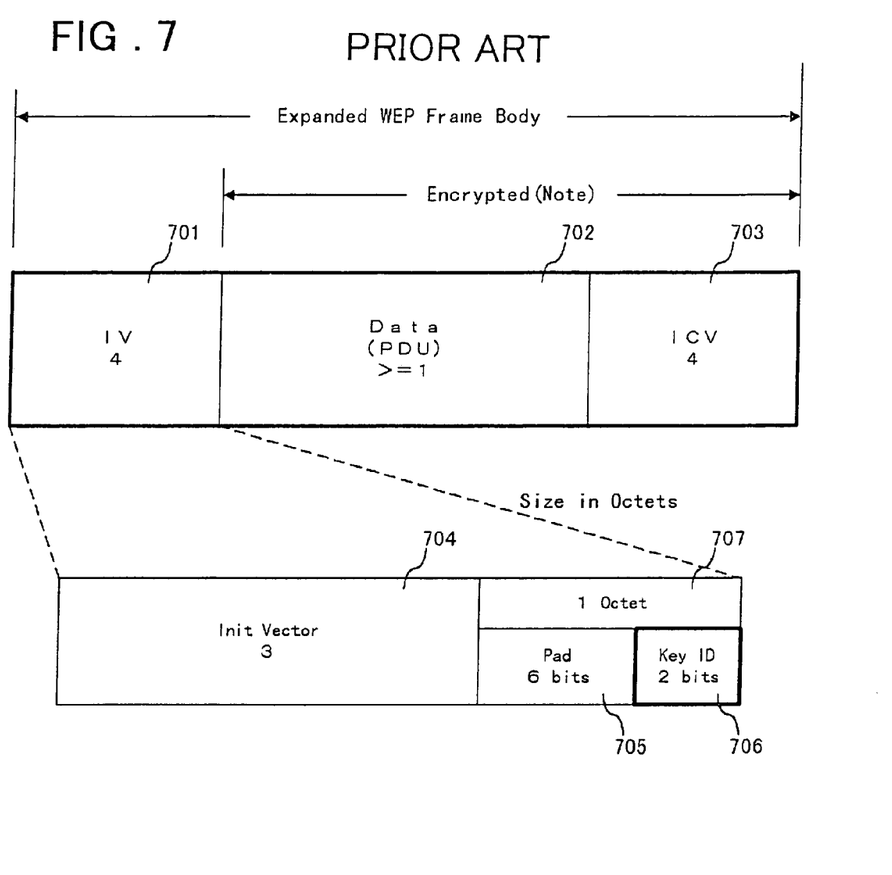
FIG. 7 is a block diagram for illustrating a decipherment system in the conventional technique by WEP of IEEE 802.11.

FIG. 7 shows a frame structure of the encrypted message (Ciphertext) 606, transmitted from FIG. 6a to FIG. 6b. The structure of the encrypted message 606 is termed an Expanded WEP Frame Body. In FIG. 7, the numeral entered in each component element is based on octets (octet-unit), that is eight bits, referred to below as bytes. The expanded WEP frame body is made up of a 4-byte IV field 701, a data field of not less than 1 byte (PDU) 702 and a 4-byte ICV field 703. The data field 702 and the ICV field 703 of the expanded WEP frame body are encrypted, whilst the IV field 701 is transmitted without encryption.

The IV field 701 contains the discrimination information for the encrypted key used in encryption. That is, the IV field 701 is made up of a 3-byte initializing vector field 704, as a main body portion, and a 1-byte information field 707, composed of a 6-bit pad field (Pad) 705 and a 2 bit key ID field (Key ID) 706.

Since this key is made up of 2-bit information, up to four encrypted keys can be discriminated. So, up to four encrypted keys can be discriminated and managed in the encipherment system employing the WEP mechanism of IEEE 802.11.

Meanwhile, a variety of encryption communication apparatus or the encrypt ion communication devices used in this sort of the wireless communication have been proposed.

For example, in the JP Patent Kokai JP-A-11-196081, there is disclosed a technique of updating an encrypted key applicable to the encryption communication system comprising a transmitting station and a receiving station according to the technique of this JP Patent Kokai JP-A-11-196081, the sequence of operations of the data communication by encryption is as follows:

First, a spare key is generated on the transmitting side. A spare key is transmitted by a message encrypted on the transmitting side using an encrypted key. The spare key is updated as encrypted key on both the transmitting and receiving sides and subsequently used for encryption and deencryption to execute data communication.

The structure for executing this method has three features, namely (1) provision of storage means for the spare key, (2) provision of storage means for the encrypted key and (3) generation of the spare key by a transmitting station.

SUMMARY OF THE DISCLOSURE

Meanwhile, in the conventional encryption communication system, described above, key management is on the one-to-one basis, to render application to a one-to-multiplicity system difficult by itself.

On the other hand, in case of application to a system furnishing a wireless accessing environment between many STAs and AP, the AP supervises a key used on accessing many terminals. For example, in a system having n STAs, the AP is in need of means for storing and supervising n encrypted keys, the circuit scale is increased, while the load imposed on the AP in processing is increased.

If, as a result of movement of a portable STA, e.g., carried by the user or displacement of the STA, e.g., by floor layout change, an AP different from an AP so far accessed is now to be accessed, the encrypted key stored and supervised by the STA ceases to be coincident with that stored and supervised by the AP, thus disabling the communication.

If the subject-matter of the JP Patent Kokai JP-A-11-196081 is to be applied to a one-to-multiplicity system, such an operational sequence may be envisioned in which the AP delivers a spare key to each STA and, after the spare keys have been delivered to the STAs in their entirety, the spare keys so delivered are updated as the encrypted keys. However, if, when it is attempted to update the encrypted key by this sequence of operations, the STAs in their entirety are not necessarily accessing the AP at all times, it may be an occurrence that the delivered spare key cannot be updated to a new encrypted key.

It is therefore an object of the present invention according to an aspect thereof to provide an encryption AP.

It is an other object of the present invention according to another aspect thereof to provide an encryption communication system between a plurality of STAs and an AP that is able to generate and supervise an encrypted key readily.

It is a further object of the present invention according to a further aspect thereof according to a further aspect thereof to provide an encryption communication system in which, if a portable STA is moved, or a STA is transferred, such that an AP different from that accessed so far is to be accessed, the new AP can be accessed unobjectionably.

It is a still further object of the present invention according to a still further aspect thereof to provide an encryption communication system in which, even if the totality of the STAs belonging to a system cannot access the AP, an encrypted key is incidentally updated to secure the reliability of the encrypted communication, and in which there is provided a sequence of operations for encrypted key updating for the STA, the encrypted key of which has not been updated, to furnish an encryption communication system having a high management efficiency.

For accomplishing the above object, the present invention provides a key management server (SV) device LAN-connected to the APs. A set of plural (k) encrypted keys used for wireless communication between the entire APs and STAs is provided and managed monistically. The set is delivered to each of the APs and the STAs.

The AP of the encrypted key updating system of the present invention has a k encrypted key storage unit and stores and supervises the encrypted key or keys delivered thereto from a key management server to have reference to the delivered key to have encrypted communication with a STA or STAs.

The STA of the encrypted key updating system of the present invention has a k encrypted key storage unit and stores and supervises an encrypted key (or keys) delivered thereto from a key management server through an AP to have reference to the delivered key to have encrypted communication with the AP.

If the entire encrypted keys stored in the encrypted key storage unit are not coincident with the AP, the STA of the encrypted key updating system of the present invention demands the key management server to update the encrypted keys in lump through an AP. If the encrypted keys are delivered from the key management server in lump, the encrypted keys, stored and managed by the STA, are updated and referenced to perform encrypted communication with the AP.

In the encrypted key updating method, according to the present invention, there is provided a key management server LAN-connected to one or more APs. A set of plural (k) encrypted keys used for wireless communication between the entire APs and STAs is provided and managed monistically for delivery to each of the APs and the STAs.

The AP of the encrypted key updating method of the present invention has a k encrypted key storage unit and stores and manages the encrypted keys delivered thereto from the key management server to have reference to the delivered keys to perform encrypted communication with the STA or STAs.

The STA of the encrypted key updating method of the present invention has a k encrypted key storage unit and stores and manages the encrypted keys delivered thereto from the key management server through the AP (or APs) to have reference to the delivered keys to perform encrypted communication with the AP (or APs).

If the entire encrypted keys, stored in the encrypted key storage unit, are not coincident with the encrypted key provided on the AP (or APs), the STA (or STAs) of the encrypted key updating method of the present invention demands the key management server through the AP (or APs) to update the encrypted keys in lump to reference to the updated keys to have encrypted communication with the AP (or APs).

Specifically, there is provided, according to an aspect of the present invention, an updating system for an encrypted key for a wireless LAN in which one or more wireless access points (APs) are provided on a LAN, the APs being wirelessly connected to one or more wireless access terminal devices (STAs) and in which data is encrypted and transmitted between the AP or APs and the STA or STAs to effect communication (encrypted communication), the system comprising a key management server (SV) device;

the key management server (SV) device, LAN-connected to the AP, comprising:

SV storage unit for holding k encrypted keys used in the encrypted communication between the AP or APs and the STA or STAs, where k is not less than 1, and an encrypted key generating unit generating the encrypted key and storing the generated encrypted key in the SV storage unit;

the SV device generating the encrypted key in the encrypted key generating unit to store the generated encrypted key in the SV storage unit, the SV device controlling the encrypted key generating unit to update the encrypted key stored in the SV storage unit to deliver the updated encrypted key to the AP and to the STA or STAs.

Upon updating the encrypted key stored in the SV storage unit, the SV device generates and updates a sole encrypted key at a time by the encrypted key generating unit.

Upon updating the encrypted key stored in the SV storage unit, the SV device generates a sole encrypted key at a time by the encrypted key generating unit and sequentially updates k encrypted keys stored in the SV storage unit one-by-one at a preset interval.

The SV device sequentially updates (k−1) of the k encrypted keys stored in the SV storage unit one-by-one at a preset first interval, the SV device updating the remaining one key at a second interval which is longer than that for the (k−1) encrypted keys.

The AP may comprise an updating unit updating an nth encrypted key, stored and managed by the AP or APs, on reception of a delivered nth encrypted key updated by the SV device, where $1 \leq n \leq k$, and an encryption unit encrypting an encrypted key updating notification message, using an encrypted key other than the nth encrypted key, for advising the STA or STAs of that effect;

the STA comprising a key generating unit generating an STA encrypted key updating requesting message on reception of the encrypted key updating notification message from the AP and an encryption unit encrypting the STA encrypted key updating requesting message, using the same encrypted key as that used in the encrypted key updating notification message, to advise the AP of that effect;

the AP also comprising a transmission unit advising the SV device of the STA encrypted key updating request on reception of the STA encrypted key updating requesting message from the STA;

the SV device also comprising a verification unit verifying whether or not an encrypted key may be delivered to the STA on reception of the STA encrypted key updating requesting message from the AP, and a delivery unit delivering to the AP the encrypted key addressed to the STA if it is verified that the encrypted key may be delivered to the STA.

The AP may comprise an updating unit updating an nth encrypted key, stored and managed by the AP or APs, on reception of a delivered nth encrypted key updated by the SV, where $1 \leq n \leq k$, and an encryption unit encrypting an encrypted key updating notification message, using an initially updated one of k encrypted keys stored and managed by the AP, to advise the STA of that effect;

the STA comprising a generator unit generating an STA encrypted key updating requesting message on reception of the encrypted key updating notification message from the AP and an encryption unit encrypting the STA encrypted key updating requesting message, using the same encrypted key as that used in the encrypted key updating notification message, to advise the AP of that effect;

the AP also comprising a transmission unit advising the SV device of the STA encrypted key updating request on reception of the STA encrypted key updating requesting message from the STA;

the SV device also comprising a verification unit verifying whether or not an encrypted key may be delivered to the STA on reception of the STA encrypted key updating requesting message from the AP and a delivery unit delivering to the AP the encrypted key addressed to the STA if it is verified that the encrypted key may be delivered to the STA.

The AP may comprise a generator unit generating an STA encrypted key delivery message on reception of an encrypted key addressed to the STA from the SV device, and an encryption unit encrypting the STA encrypted key delivery message, using an encrypted key other than the nth encrypted key, to advise the STA of that effect;

the STA also comprising an updating unit updating an nth encrypted key stored and managed by the STA on reception of an nth encrypted key by the STA encrypted key delivery message from the AP.

The AP may comprise a generator unit generating an STA encrypted key delivery message on reception of an encrypted key addressed to the STA from the SV device, and an encryption unit encrypting the STA encrypted key delivery message, using an initially updated one of k encrypted keys stored and managed by the AP, to advise the STA of that effect;

the STA also comprising an updating unit updating an nth encrypted key stored and managed by the STA on reception of an nth encrypted key by delivered the STA encrypted key delivery message from the AP.

The STA may comprise means for notifying the AP of a lumped STA encrypted key updating requesting message on detection of a preset factor;

the AP comprising means for notifying the SV device of the lumped STA encrypted key updating request on reception of the lumped STA encrypted key updating requesting message from the STA;

the SV device comprising means for verifying whether or not the encrypted key addressed to the STA can be delivered in a lump to the STA on reception of the lumped STA encrypted key updating request from the AP, and means for delivering encrypted key addressed to the STA in lump to the AP if the verifying means has verified that the encrypted key can be delivered in a lump to the STA;

the AP also comprising means for generating a lumped STA encrypted key delivery message on reception in lump of the encrypted keys addressed to the STA from the SV device, and for notifying the STA of that effect;

the STA also comprising means for updating the encrypted keys stored in the STA in lump on reception of the lumped STA encrypted key delivery message from the AP.

According to a second aspect of the present invention, there is provided an updating method for an encrypted key for a wireless LAN. The method comprises:

(a) providing one or more wireless access points (APs) provided on a LAN, the APs being wirelessly connected to one or more wireless access terminal devices (STAs) and in which data is encrypted and transmitted between the AP and the STA or STAs to effect communication termed as "encrypted communication", (b) generating, by a key management server (SV) device, LAN-connected to the AP, k encrypted keys, k being not less than 1, used for encrypted communication between the AP and the STA or STAs, (c) storing and managing, by the SV device, the generated encrypted key, (d) updating the encrypted key under a preset condition, and (e) delivering the updated encrypted key to the AP and to the STA or STAs.

The SV device in updating the k encrypted keys stored and managed by the SV may update the k encrypted keys at a rate of one at a time.

The SV device in updating the k encrypted keys stored and managed by the SV device sequentially may update the k encrypted keys at a rate of one at a preset time interval.

The SV device may sequentially update (k−1) of the k encrypted keys stored in and managed by the SV device one-by-one at a first preset interval, the SV device updating the remaining one key at a second interval longer than for the (k−1) encrypted keys.

The AP may have encrypted communication with the STA or STAs using an optional encrypted key other than the nth encrypted key stored in and managed by the AP, during a period of time since updating of the nth encrypted key stored in and managed by the AP until the encrypted key is undated next, where $1 \leq n \leq k$.

The AP may have encrypted communication with the STA or STAs, sequentially using (k−1) encrypted keys, other than the nth encrypted key stored in and managed by the AP, during a period of time since updating of the nth encrypted key stored in and managed by the AP until next updating of encrypted key, where $1 \leq n \leq k$.

The AP may have encrypted communication with the STA or STAs, using an initially updated one of k encrypted keys stored in and managed by the AP.

The STA or STAs may have encrypted communication with the AP, using an optional one of (k−1) encrypted keys, other than the nth encrypted key, stored in and managed by the STA or STAs.

The STA or STAs may have communication with the AP, sequentially using (k−1) encrypted keys, other than the nth encrypted key, stored in and managed by the STA or STAs.

The STA or STAs have communication with the AP, using the last updated one of k encrypted keys stored in and managed by the STA or STAs.

PREFERRED EMBODIMENTS OF THE INVENTION

A preferred embodiment of the present invention is hereinafter explained with reference to the drawings.

Figure 1:
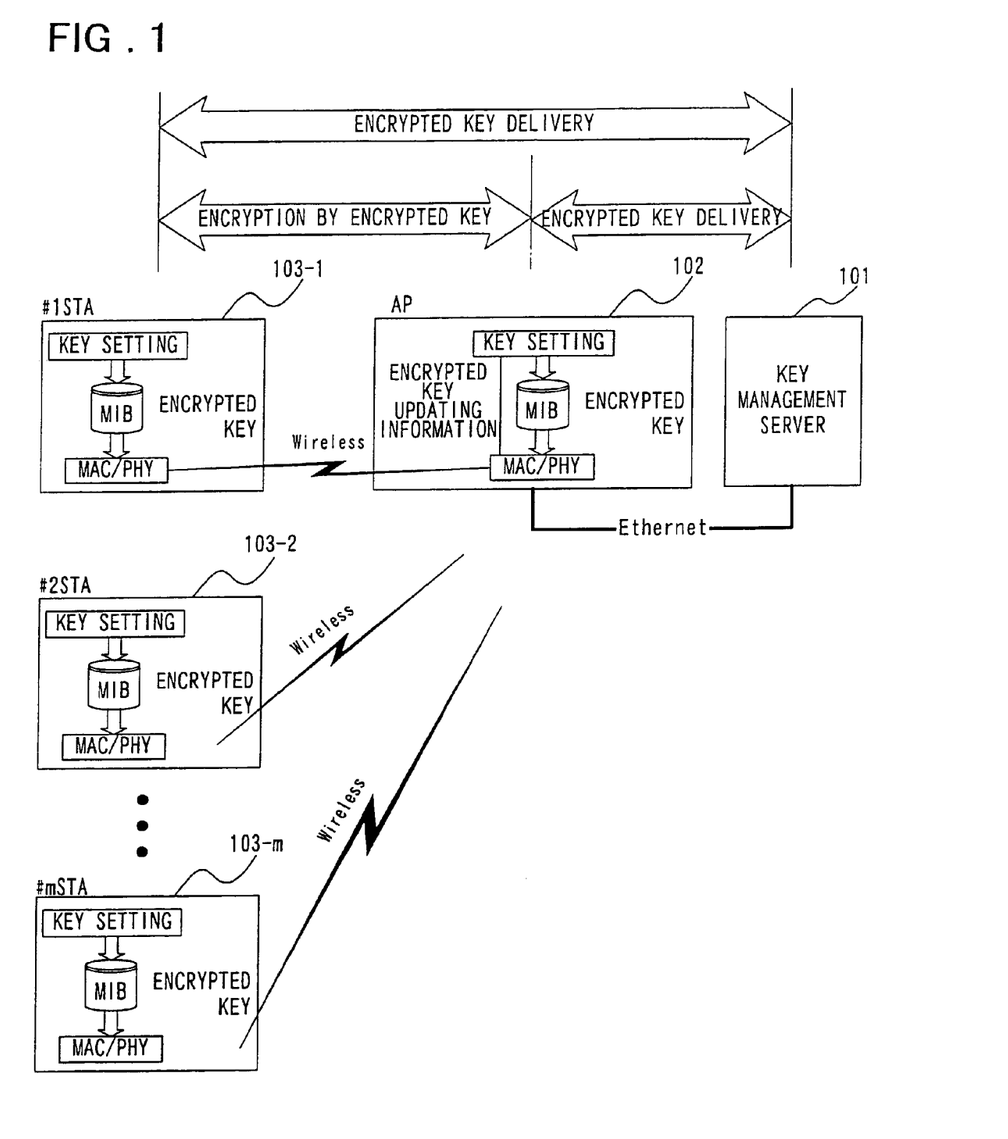
FIG. 1 is a block diagram showing the structure of an embodiment of a wireless LAN system according to the present invention.

FIG. 1 is a block diagram showing a structure of a wireless LAN system embodying the present invention. The wireless LAN system, embodying the present invention, shown in FIG. 1, is made up of a key management server 101, an access point AP 102, and a plurality of, herein m, access terminal devices (stations) STAs (#1STA103-1, #2STA103-2, . . . #mSTA103-m).

An AP 102 and a STA 103 are interconnected by a wireless LAN connection under IEEE 802.11.

The data communication between the STA (or STAs) and the AP (or APs) is performed by an encipherment system employing the WEP mechanism. In the encipherment system, each of the STAs and the APs memorizes and supervises four encrypted keys to effect encryption and decryption.

In a wireless section between the AP 102 and the STA 103, the key management server 101 generates and supervises an encrypted key or keys used for encrypt ion. On generation of a new key, the key management server delivers it to the AP 102 and to the STAs 103.

When the encrypted key is delivered from the key management server 101 to the AP 102, the latter updates an encrypted key used for communication with the STAs 103 to memorize and supervise the updated encrypted key as well as to advise the STAs 103 of the updating of the encrypted key.

Then each of STAs 103 memorizes and supervises the encrypted key delivered from the key management server 101 through the AP 102 and has communication with the AP using the encrypted key.

Figure 2:
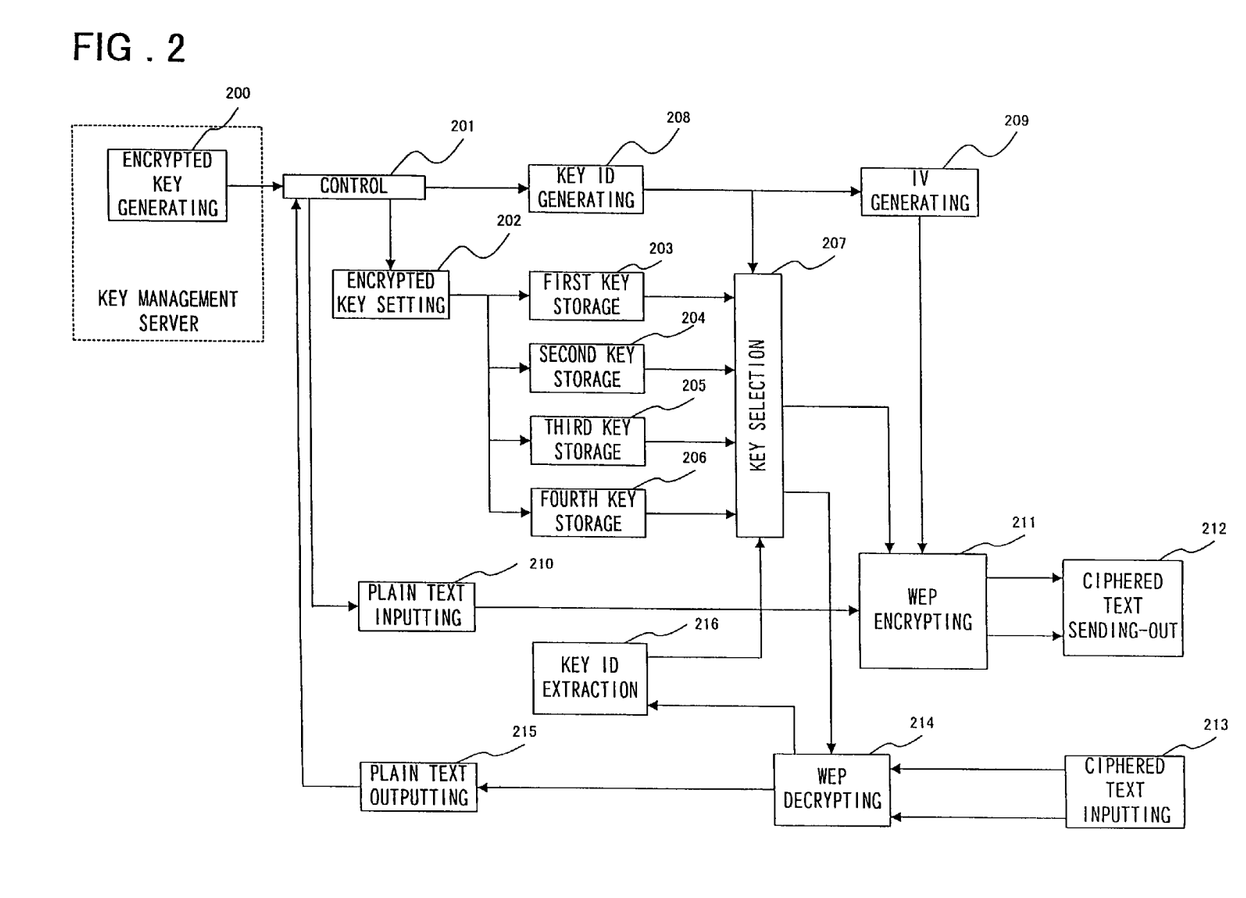
FIG. 2 is a block diagram showing the structure of an AP according to the present invention.

FIG. 2 shows a block diagram showing a structure of the AP 102. The AP 102, shown in FIG. 2, is made up of control unit 201, encrypted key setting unit 202, first key storage unit 203, second key storage unit 204, third key storage unit 205, fourth key storage unit 206, key selection unit 207, key ID generating unit 208, IV generating unit 209, plain text input unit 210, WEP encryption unit 211, ciphered text sending unit 212, ciphered text inputting unit 213, WEP decryption unit 214, plain text output unit 215 and a key ID extraction unit 216.

It is noted that the WEP encryption unit 211 is configured in accordance with the encipherment system by WEP of IEEE 802.11, explained with reference to FIG. 6a. On the other hand, the WEP decryption unit 214 is configured in accordance with the decipherment system by WEP of IEEE 802.11, explained with reference to FIG. 6b.

The first to fourth key storage units 203 to 206, shown in FIG. 2, may be configured by a buffer termed MIB, as shown in FIG. 1. The MIB is a memory unit of high confidentiality which may be rewritten but cannot be read by the software.

Meanwhile, the encrypted key generating unit 200, shown in FIG. 2, is included in the key management server.

Figure 3:
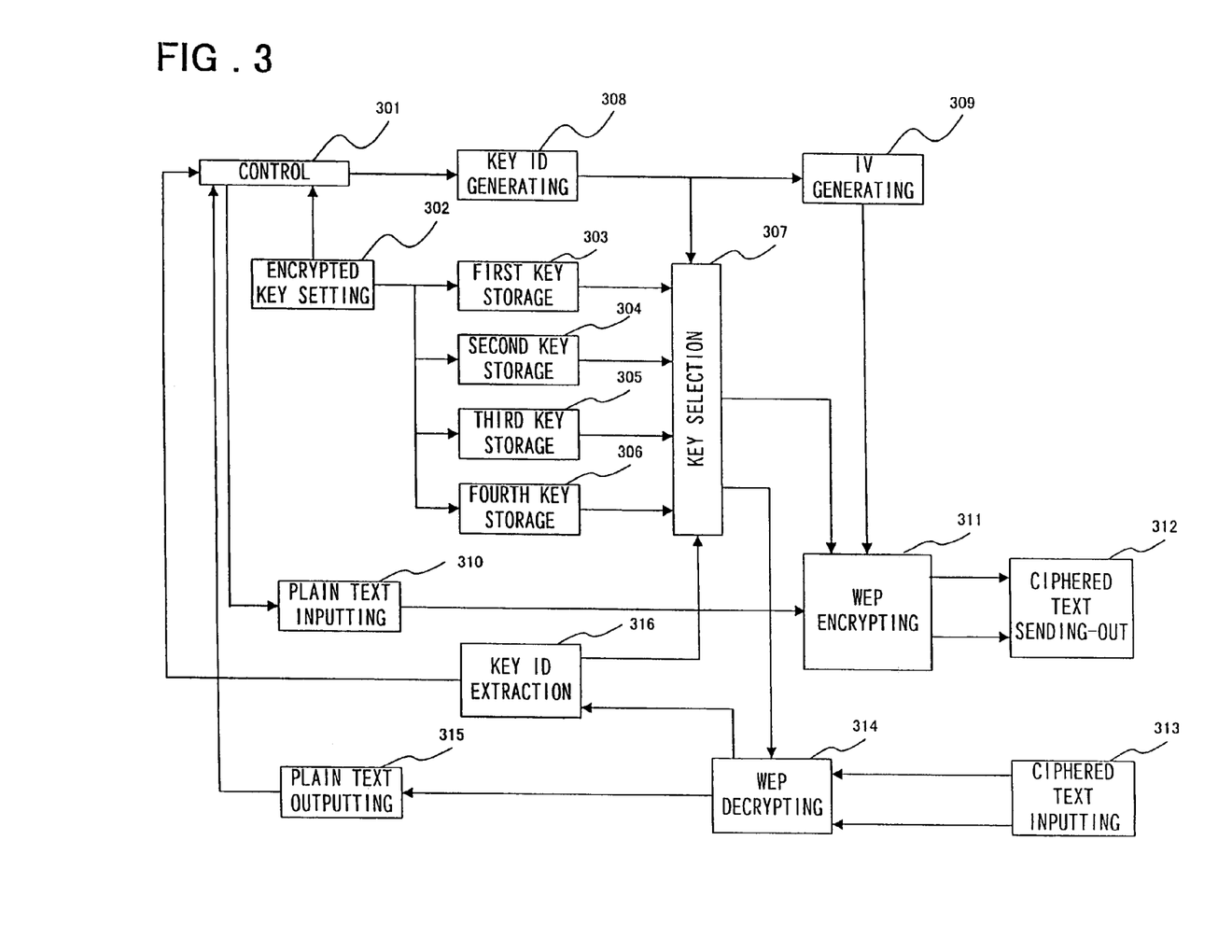
FIG. 3 is a block diagram showing the structure of an STA according to the present invention.

FIG. 3 shows a block diagram showing a structure of the STA 103. The STA 103, shown in FIG. 3, is made up of control unit 301, encrypted key setting unit 302, first key storage unit 303, second key storage unit 304, third key storage unit 305, fourth key storage unit 306, key selection unit 307, key ID generating unit 308, IV generating unit 309, plain text input unit 310, WEP decrypting unit 311, ciphered text sending unit 312, ciphered text inputting unit 313, WEP decryption unit 314, plain text output unit 315 and a key ID extraction unit 316. Similarly to the key storage units, shown in FIG. 2, the first to fourth key storage units 303 to 306 may be each configured by an MIB.

Figure 4:
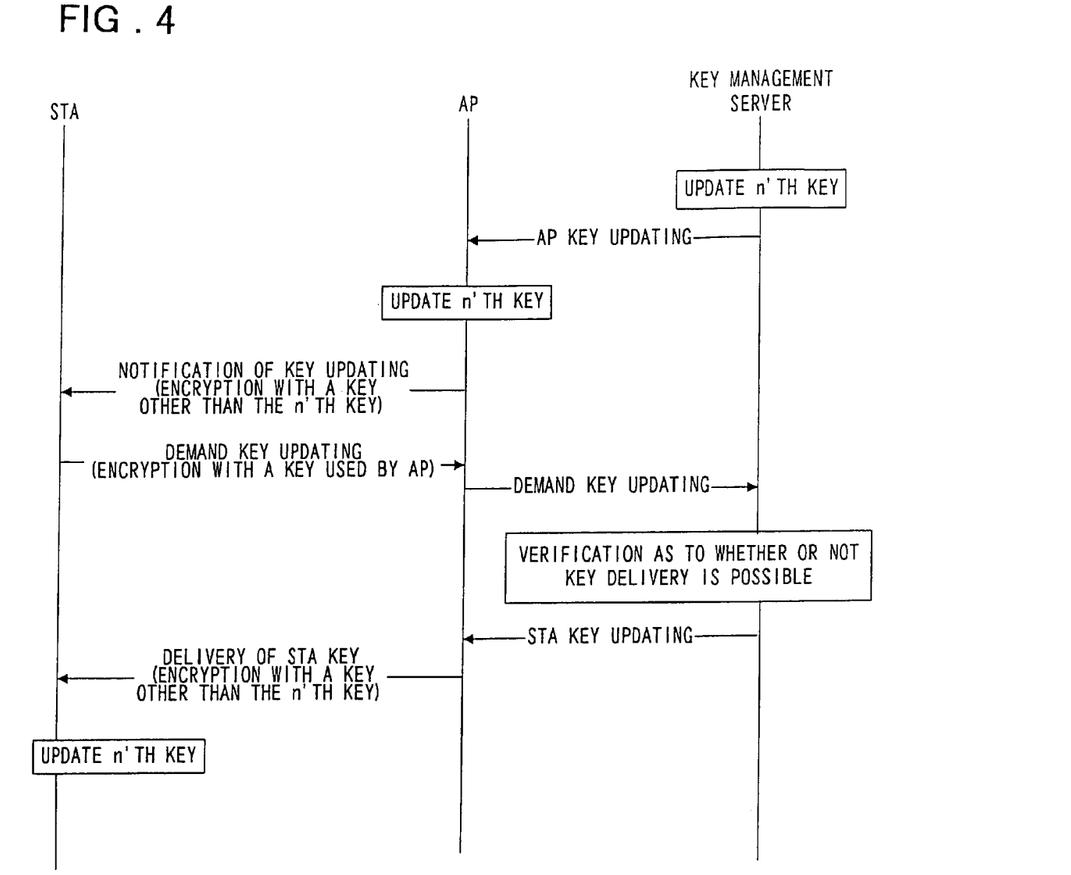
FIG. 4 is a sequence chart for illustrating the sequence of encrypted key updating operations according to the present invention.
Figure 5:
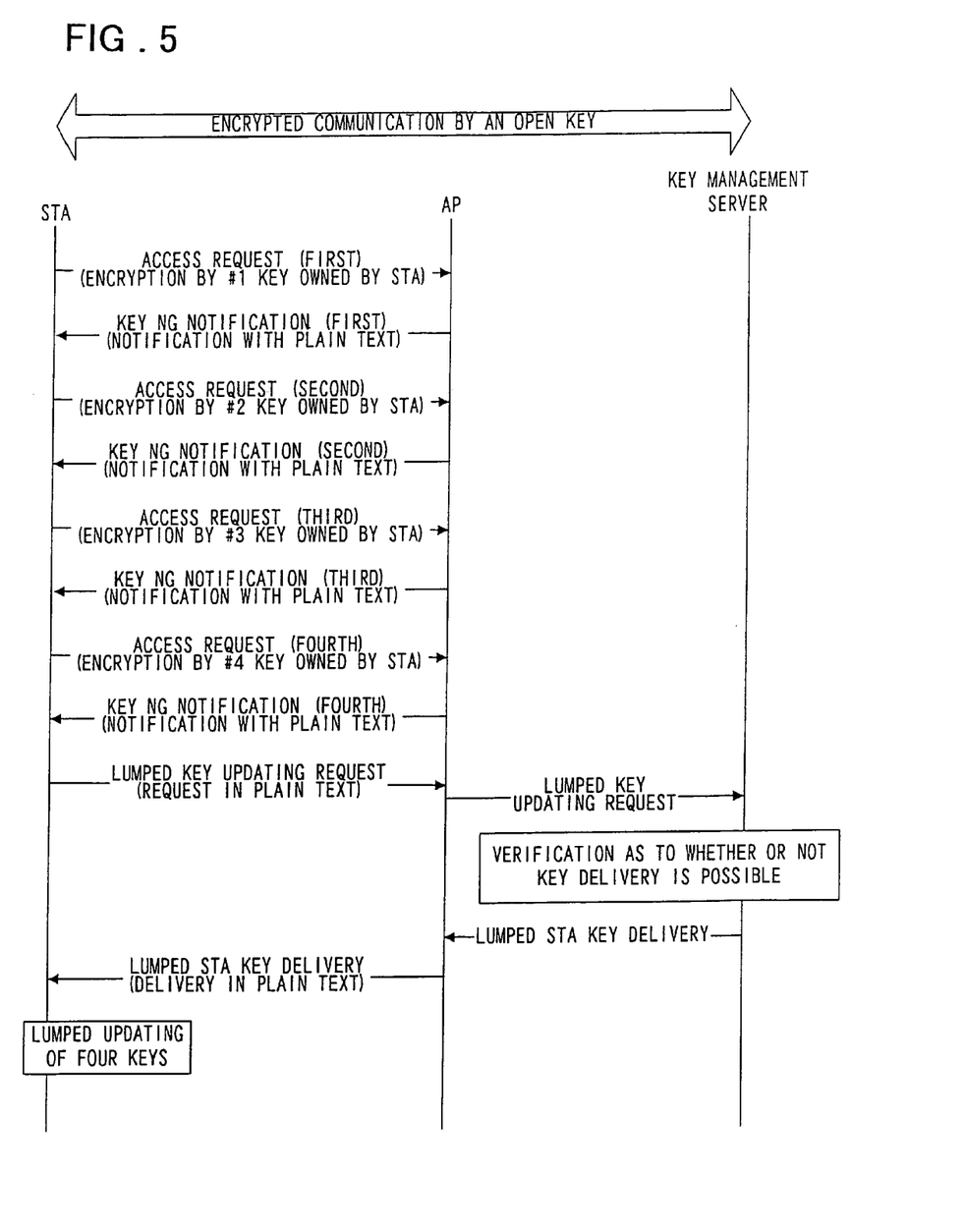
FIG. 5 is a sequence chart for illustrating the sequence of encrypted key updating operations according to the present invention.

FIGS. 4 and 5 show sequence charts illustrating the sequence of operations in updating the encrypted key in the wireless LAN system according to the present invention.

FIG. 4 shows a routine operational sequence in updating the encrypted key. Specifically, FIG. 4 shows the operational sequence of delivering a new encrypted key to an AP and a STA for updating if, as the STA and the AP hold and supervise the same encrypted key, the key management server has generated such new encrypted key.

FIG. 5 shows the sequence of operations in updating the encrypted key stored and supervised by the STA when none of the four encrypted keys memorized and managed by the STA and the AP is coincident. This operational sequence is an encrypted key updating sequence which is applied if the portable STA device is carried outdoors for a long period and returned after the totality of the encrypted keys on the AP side are updated, and if, in this state, it is attempted to access the AP, or if a given STA is left in an inoperative state for a long period and is operated after the totality of the encrypted keys on the AP side have been updated.

First, the operation of updating the routine encrypted key is explained by referring to FIGS. 4 and 1 through 3.

If, in FIG. 4, the key management server has generated an optional key (n'th key) of the four encrypted keys, and has updated the n'th encrypted key, stored and managed in the key management server, by way of updating the n'th key, the key management server delivers the encrypted key to the AP (AP key delivery).

On reception of the AP key, delivered by the key management server, the AP updates an n'th one of the four encrypted keys, memorized and managed in the AP (updating of the n'th key) to notify the STA of the updating of the key to the STA (notification of the key updating). The encrypted key is not included in the key updating notification transmitted at this time to the STA. However, the AP encrypts the key updating notification message, using an encrypted key other than the n'th key.

The following explanation is made with reference to FIG. 2 on the assumption that the key ID of the encrypted key delivered from the key management server to the AP is "1" (n=1).

Referring to FIG. 2, the encrypted key generating unit 200 on generation of a new encrypted key transmit same to the AP control unit 201 (delivery of the AP key). The AP control unit 201 transfers an encrypted key, delivered from the key management server and the key ID (1) to the encrypted key setting unit 202, which then stores the encrypted key received from the control unit in the first key storage unit 203 in association with the key ID to update the stored encrypted key.

The control unit 201 then controls the plain text input unit 210 and the key ID generating unit 208 to notify the STA of the updating of the key. The plain text input unit 210 generates a key updating notification message, under control by the control unit, to enter the message to the WEP encryption unit 211. The key ID generating unit 208 generates an ID different from the ID of the updated key. It is assumed here that a key ID "2" is outputted, as an example. The key selection unit 207 selects the encrypted key memorized in the second key storage unit 204 to input the selected encrypted key to the WEP encryption unit 211. The IV (initial vector) generating unit 209 generates an IV, with the key ID being set to 2, to input the generated IV to the WEP encryption unit 211.

The WEP encryption unit 211 encrypts the key updating notification message, input from the plain text input unit 210, using the IV input from the IV generating unit 209 and the encrypted key input from the key selection unit 207. The ciphered text sending unit 212 inputs the ciphered text and the IV, prepared by the WEP encryption unit 211, to construct the expanded WEP frame which is output to e.g., a transmission device.

Referring to FIG. 4, the STA on reception of a notification on key updating from the AP requests the key management server to update the key through the AP. The key server is responsive thereto to check whether or not the STA is intrinsic (truly targeted) one. If the key server verifies that the delivery of the STA key is possible, the encrypted key is delivered to the STA through the AP. On reception of the delivered STA key from the STA key, the STA memorizes and manages the new encrypted key.

In the wireless LAN according to the present invention, the above-described procedure is used for the wireless section (or domain) between the STA (STAs) and the AP (APs) to assure higher safety.

The operation of the STA requesting the updating of the key on reception of the key updating notification is explained with reference to FIG. 3.

Referring to FIG. 3, the key updating notification from the AP is input to the ciphered text inputting unit 313 where it is divided into the IV and the ciphered text which are routed to the key ID extraction unit 316. The key ID extraction unit 316 extracts the key ID in the IV to control the key selection unit 307.

In the explanation on the operation in FIG. 2, the key ID is set to "2". So, the key selection unit 307 selects the second key storage unit 304. The WEP decryption unit 314, fed with the second key, issued by the key selection unit 307, decryptes the key change notification message. The plain text output unit 315 outputs the plain text decrypted by the WEP decryption unit 314.

The control unit 301 refers to an output of the plain text output unit 315. On detection of the key updating notification, the control unit 301 returns a key updating request message. The control unit 301 refers to the key ID output by the key ID extraction unit 316 to transfer the key ID to the key ID generating unit 308, which then outputs the key ID "2" received from the control unit. The key selection unit 307 thus selects the second key storage unit. The IV generating unit 309 generates an IV of the key ID "2". The control unit 301 also controls the plain text input unit 310 to generate the key updating request message.

Using the IV, fed from the IV generating unit 309, and the encrypted key, fed from the key selection unit 307, the WEP encryption unit 311 encrypts the key updating request message fed from the plain text input unit 310. The ciphered text sending unit 312, fed with the ciphered text and the IV, prepared by the WEP encryption unit 311, constructs an expanded WEP frame, to output the constructed frame to e.g., the transmission device.

The operation in which the AP, receiving the key updating request message from the STA, sends a key updating request message to the key management server to send the STA key delivery from the key management server to the STA, is explained with reference to FIG. 2.

In FIG. 2, the key updating request message from the STA is input to the ciphered text inputting unit 213 where it is divided (separated) into the IV and the ciphered text which are routed to the WEP decryption unit 214. The WEP decryption unit 214 outputs the input IV to the key ID extraction unit 216, which then extracts the key ID in the IV to control the key selection unit 207.

Since the key ID sent out by the STA is "2", the key selection unit 207 selects the second key storage unit 204. The WEP decryption unit 214, fed with the second key, output by the key selection unit 207, decodes the key change request message. The plain text output unit 215 outputs the plain text decoded by the WEP decryption unit 214.

The control unit 201 references an output of the plain text output unit 215. On detection of the key updating request, the control unit 201 sends out a key updating request message to the key management server.

The key updating request message, issued by the STA, includes the information proper to the STA. This information is referred to in order for the key management server to verify whether or not the key can be delivered. That is, the STA sends out the MAC address of the STA, the identification information of the STA user and the password, contained as the intrinsic information in the key updating request message.

The key management server compares the intrinsic information from the STA to an intrinsic information previously registered in connection with the STA. The key management server delivers the encrypted key to the STA only when it is confirmed that the STA as the sender of the key updating request message as received is an intrinsic one.

Referring to FIG. 2, the encrypted key generating unit 200 owned by the key management server delivers the encrypted key addressed to the STA to the control unit 201 of the AP (STA key delivery). The control unit 201 of the AP inputs the STA key delivery message, delivered from the key management server, to the plain text input unit 210. The encrypted key generating unit 200 then controls the key ID generating unit 208 to deliver the encrypted key to the STA. The plain text input unit 210 inputs the STA key delivery message from the control unit to the WEP encryption unit 211. The key ID generating unit 208 outputs the key ID "2". The key select ion unit 207 selects the encrypted key stored in the second key storage unit 204 to input the selected key to the WEP encryption unit 211. The IV generating unit 209 generates an IV with the key ID set to 2 to send the generated IV to the WEP encryption unit 211.

The WEP encryption unit 211 encrypts the STA key delivery message, input from the plain text input unit 210, using the IV input from the IV generating unit 209 and from the key selection unit 207. The ciphered text sending unit 212 is fed with the ciphered text and with the IV, prepared by the WEP encryption unit 211, to construct the expanded WEP frame, to output the constructed expanded WEP frame to e.g., a transmission device.

Referring to FIG. 3, the operation of the STA receiving the STA key delivery message to update the encrypted key is hereinafter explained.

Referring to FIG. 3, an STA key delivery message from the AP is input to the ciphered text inputting unit 313 where it is divided into an IV and a ciphered text both of which are input to WEP decryption unit 314. This WEP decryption unit outputs the input IV to the key ID extraction unit 316, which then takes out a key ID in the IV to control the key selection unit 307.

The key selection unit 307 selects the second key storage unit 304 in accordance with the key ID. The WEP decryption unit 314 is input to the second key output by the key selection unit 307 to decode the STA key delivery message. The plain text output unit 315 outputs the plain text decoded by the WEP decryption unit 314.

The control unit 301 references the output of the plain text output unit 315 and, on detection of the STA key delivery message, transfers the received STA key to encrypted key setting unit 302. This encrypted key setting unit references the ID of the delivered encrypted key to store the ID in associated key storage unit to update the encrypted key. In the present embodiment, the first key is updated, so that the key ID "1" is contained in the plain text. So, the new encrypted key is stored in the first key storage unit 303.

By the above-described operations, the encrypted key generated by the key management server can be delivered to the AP and to the STA to update the encrypted keys stored and supervised thereby.

The management of the encrypted key (keys) for a large number of STAs and plural APs is now explained.

In the wireless LAN system, according to the present invention there are occasions wherein plural APs are connected to a key management server. It may be an occurrence that the STAs belonging to a system accesses to an AP different from a previous AP due to change in the floor layout or due to movement of the portable STA. In this consideration, in order to allow for facilitated management of the encrypted keys of a large number of STAs in addition to those of the plural APs, the key management server of the wireless LAN of the present invention uses a set of encrypted keys (four keys), common to the entire system, as the encrypted key to be delivered to each AP and to each STA. By so doing, the number of the encrypted keys managed can be minimized to diminish the load otherwise placed on the system. If the STA is moved across plural APs, occurrence of non-coincidence of the encrypted keys can be evaded since the same encrypted keys are owned by the respective APs.

The updating of the encrypted keys and management of the encrypted keys in the STAs and in the APs in the wireless LAN of the present invention are hereinafter explained.

In the WEP of IEEE 802.11, the four encrypted keys can be discriminated for management and supervision. In the wireless LAN system of the present invention, several methods, as now explained, are adopted in connection with the updating of the encrypted keys in case of communication of the APs and the STAs to provide for compatibility of high management performance and high information confidentiality.

As a first exemplary encrypted key updating method, the key management server sequentially updates the four encrypted keys one-by-one each time a preset time period has elapsed. Specifically, encrypted key updating is performed at a rate of one encrypted key, e.g., per week. By so doing, the respective encrypted keys are updated once every four weeks. Therefore, a person carrying a portable STA outwards can access to the AP (or APs) unobjectionably if the STA is returned within four weeks.

The length of this time period can be set by the key management server to, for example, one day or to one month, depending on system requirements.

In a system which updates the encrypted keys as described above, the STAs and the APs manage the encrypted key in one of the following several methods.

In one of these methods, the AP (or APs) communicates with the STA (or STAs) with the use not of the last updated one of the four encrypted keys, but with the use sequentially of the three remaining encrypted keys, for communication.

In a system where there are present plural STAs, the updating of the encrypted keys, stored and supervised by the entire STAs, is time-consuming. That is, the encrypted key is updated individually from the key management server to each of the APs and STAs, such that, when an AP has updated one of the encrypted keys, each STA is responsive to an encrypted key updating notification from the AP to sequentially request the key management server to update its encrypted keys to have a key delivered thereto from the key management server to update the encrypted key individually.

By employing this method, it is possible to evade troubles ascribable to the non-coincidence of the encrypted key since updating of a sole encrypted key of the AP until completion of the updating of the encrypted keys stored and managed by the entire STAs.

In another method, the APs communicate with the STAs using the initially updated encrypted key.

By so doing, the STAs are able to acquire the chance of updating of the encrypted key for a longer time duration.

In the above-described first and second methods for updating the first encrypted key, the STAs communicate with the last updated one of the encrypted keys stored and managed thereby. In this manner, the possible time of carrying the portable STA outwards or the time during which the STA can remain inoperative can be maximized. On the other hand, an encrypted key other than the last updated encrypted key may optionally be used for improving the information confidentiality.

As the second encrypted key updating method, the key management server sets the updating period of a specified encrypted key so as to be (e.g., significantly) longer than that of other encrypted keys, so that the key management server sequentially updates the other encrypted keys with a shorter updating period. Specifically, the first encrypted key is updated every three months, whilst the second to fourth encrypted keys are updated every day. By so doing, a person carrying the portable STA outdoors or outwards is able to access to the AP unobjectionably if the STA is returned within three months, thus improving the convenience. Since the other three encrypted keys are updated every three days, these encrypted keys can be used for communication to improve the information confidentiality.

With this method, the encrypted key updating period can be optionally set depending on system requirements.

With the system updating the encrypted key in the manner described above, the STA and the AP are able to use the encrypted keys by any one of the following several methods.

With the first method, the AP has communication with the STA, using the encrypted keys, updated at a period of three days. If the STA, holding and supervising an encrypted key coincident with the AP, has communication using the encrypted keys updated at a period of three days, it is possible to maintain high information confidentiality in the communication between the STA and the AP. However, if the STA is carried outwards for more than three days and subsequently returned to access the AP, or if the STA remains inoperative for more than three days and again is in operation to access the AP, the encrypted key non-coincidence occurs, in which case the AP has communication with the STA by the second method.

With the second method, if the encrypted key of the message from the STA is not coincident with that stored and managed by the AP, the latter attempts to have communication with the STA, using the encrypted key updated every three months. If the encrypted key coincidence is achieved by this method, the AP advises the STA of the updating of the encrypted key. The STA thus raises a demand for updating the encrypted key and has the latest encrypted key delivered from the key management server so that it is now possible to update the encrypted key.

Meanwhile, if the above-mentioned second encrypted key updating method is used, the encrypted keys in their entirety become non-coincident in case of prolonged carrying outwards of the STA or non-operation of the STA for longer than three months.

The operation of updating the encrypted key in such case is explained by referring to FIG. 5.

Referring to FIG. 5, an STA not having an encrypted key coincident with that of the AP demands an access to the AP, sequentially using encrypted keys, stored and managed by the STA, beginning from the first key (first accessing demand). Since the encrypted key is not coincident, the AP notifies key non-coincidence, using a plain text (first key NG notification).

If the non-coincident of the encrypted key repeatedly occurs four times, the STA requests lumped key updating (first key NG notification). The AP transfers the lumped key updating demand from the STA to the key management server. The private information of the STA is contained in the lumped encrypted key updating request message, as in the case of the operation explained in connection with FIG. 4.

The key management server checks the private information of the STA. If the key management server verifies the checked private information to be intrinsic, it delivers the STA encrypted keys in a lump through the AP. On reception of the STA encrypted keys from the key management server in lump, the STA updates, in lump, the encrypted keys it has stored and managed.

The STA then demands access to the AP, using a new encrypted key. The AP checks the encrypted key and, if it has verified the encrypted key to be coincident, it starts usual data communication.

In FIG. 5, it is assumed that STA demands access four times for ease in understanding. However, a more efficient sequence may, of course, be contemplated. That is, such a sequence may be contemplated in which the STA uses the last updated one of the four encrypted keys, for the first access demand, and in which, if this encrypted key is non-coincident, the STA promptly demands lumped key updating.

Meanwhile, in the sequence chart of FIG. 5, the wireless communication between the STA and the AP as from the lumped encrypted key updating request by the STA until lumped encrypted key delivery to the STA is to be in plain text. The reason is that, in FIG. 5, it is presupposed that separate encrypted communication including the wireless path between the AP and the STA is to be applied.

That is, an open key e.g., is used in a domain from the key management server to the STA or in a domain from the AP to the STA, as shown in an upper part of FIG. 5, to use the encryption and decoding separate from the teaching of the present invention, to enable the encrypted key of the STA to be updated more safely in the sequence of FIG. 5.

According to the present invention, it is possible to update the encrypted keys in a lump by the wireless LAN system, that is to update the encrypted keys without the manual operation of setting an encrypted key in the STA, even if the four encrypted keys, stored and managed by the STA, cease to be coincident in their entirety with those of the AP.

The meritorious effects of the present invention are summarized as follows.

According to the present invention, as described above, there is provided a key management server device, LAN-connected to one or more AP. A set of k encrypted keys are used for encrypted wireless communication between the totality of the APs and the STAs and supervised in lump by the key management server device. In this manner, there is provided a one-for-multiplicity wireless LAN system where there is no risk of the circuit scale of the device increasing due to encrypted key management or of the processing load increasing for management of the encrypted keys.

Moreover, according to the present invention, there is provided a wireless LAN system in which, if, as a result of the portable STA being carried outwards by the user or of the STA being transferred due to e.g., floor layout change, an AP different from the previously accessed AP is to be accessed, there is no risk that the encrypted keys stored and managed becomes non-coincident between the STA and the AP accessed by the STA.

Moreover, according to the present invention, there is provided a wireless LAN system of high management performance in which, if, as a result of a user carrying a portable STA outwards for prolonged time, the STA encrypted key is not updated, such that, when the user returns the STA, the entire encrypted keys stored by the STA is non-coincident with the accessed AP, an encrypted key updating sequence for the STA may be provided, so that the encrypted key memorized by the STA can be updated without requiring complex accommodating operation by human intervention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An updating system for an encrypted key for a wireless LAN in which a wireless access point is provided on a LAN, said wireless access point being wirelessly connected to a plurality of wireless access terminal devices and in which data is encrypted and transmitted between the wireless access point and the plurality of wireless access terminal devices, said system comprising:
   a key management server device, LAN-connected to said wireless access point, comprising:
   a storage unit for holding k encrypted keys used in the encrypted communication between said wireless access point and the plurality of wireless access terminal devices, where k is greater than 1; and
   an encrypted key generating unit generating said k encrypted keys and storing the generated k encrypted keys in said storage unit;
   wherein said key management server device controls said encrypted key generating unit to update one of said encrypted keys stored in said storage unit and delivers the updated encrypted key to said wireless access point and to said plurality of wireless access terminal devices;
   wherein each one of said wireless access point and said plurality of wireless access terminal devices decrypts wireless communications using said updated encrypted key.

2. The updating system for an encrypted key for a wireless LAN as defined in claim 1 wherein:
   upon updating said encrypted key stored in said storage unit, said key management server device generates a sole encrypted key at a time by said encrypted key generating unit and sequentially updates k encrypted keys stored in said storage unit one-by-one at a preset interval.

3. The updating system for an encrypted key for a wireless LAN as defined in claim 1 wherein:
   where k is greater than 1, said key management server device sequentially updates all except a remaining one of said k encrypted keys stored in said storage unit one-by-one at a preset first interval, said key management server device updating the remaining one key at a second interval which is longer than said preset first interval.

4. The updating system for an encrypted key for a wireless LAN as defined in claim 1 wherein:
   said one of said plurality of wireless access terminal devices comprises means for notifying the wireless access point of a lumped encrypted key updating requesting message on detection of a preset factor;
   said wireless access point comprising means for notifying said key management server device of reception of said lumped encrypted key updating requesting message from said one of said plurality of wireless access terminal devices;
   said key management server device comprising means for verifying whether or not the encrypted key addressed to said one of said plurality of wireless access terminal devices can be delivered in a lump to said one of said plurality of wireless access terminal devices on reception of said lumped encrypted key updating request from said wireless access point; and
   means for delivering encrypted key addressed to said one of said plurality of wireless access terminal devices in lump to said wireless access point if said verifying means has verified that the encrypted key can be delivered in a lump to said one of said plurality of wireless access terminal devices;
   said wireless access point also comprising means for generating a lumped encrypted key delivery message on reception in lump of said encrypted keys addressed to said one of said plurality of wireless access terminal devices from said key management server device;
   said one of said plurality of wireless access terminal devices also comprising means for updating the encrypted keys stored in said one of said plurality of wireless access terminal devices in lump on reception of said lumped encrypted key delivery message from said wireless access point.

5. The updating system for an encrypted key for a wireless LAN as defined in claim 1 wherein:
   upon updating said encrypted key stored in said storage unit, said key management server device generates and updates a sole encrypted key at a time by said encrypted key generating unit.

6. The updating system for an encrypted key for a wireless LAN as defined in claim 5 wherein:
   said wireless access point comprises an updating unit updating an nth encrypted key, stored and managed by said wireless access point, on reception of a delivered nth encrypted key updated by said key management server device, where $1 \leq n \leq k$, and where k is greater than 1, and an encryption unit encrypting an encrypted key updating notification message, using an encrypted key other than said nth encrypted key;
   each of said plurality of wireless access terminal devices comprising a key generating unit generating an encrypted key updating requesting message on reception of said encrypted key updating notification message from said wireless access point and an encryption unit encrypting said encrypted key updating requesting message, using the same encrypted key as that used in said encrypted key updating notification message; and
   said wireless access point also comprising a transmission unit advising said key management server device of reception of said encrypted key updating requesting message;
   said key management server device also comprising a verification unit verifying whether or not an encrypted key may be delivered to one of said plurality of wireless access terminal devices on reception of the encrypted key updating requesting message from said wireless access point, and a delivery unit that delivers, if such verification is true, to said wireless access point the encrypted key addressed to said one of said plurality of wireless access terminal devices.

7. The updating system for an encrypted key for a wireless LAN as defined in claim 5 wherein:
   said wireless access point comprises an updating unit updating an nth encrypted key, stored and managed by said wireless access point, on reception of a delivered nth encrypted key updated by said key management server device, where $1 \leq n \leq k$, and an encryption unit encrypting an encrypted key updating notification message, using an initially updated one of k encrypted keys stored and managed by said wireless access point;
   each of said plurality of wireless access terminal devices comprising a generator unit generating an encrypted key updating requesting message on reception of said encrypted key updating notification message from said wireless access point and an encryption unit encrypting said encrypted key updating requesting message, using the same encrypted key as that used to encrypt said encrypted key updating notification message;

said wireless access point also comprising a transmission unit advising said key management server device of the reception of said encrypted key updating requesting message;

said key management server device also comprising a verification unit verifying whether or not an encrypted key may be delivered to one of said plurality of wireless access terminal devices on reception of the encrypted key updating requesting message from said wireless access point and a delivery unit that delivers, if such verification is true, to said wireless access point the encrypted key addressed to said one of said plurality of wireless access terminal devices.

8. The updating system for an encrypted key for a wireless LAN as defined in claim 6 wherein said wireless access point comprises a generator unit generating an encrypted key delivery message on reception of an encrypted key addressed to said one of said plurality of wireless access terminal devices from said key management server device; and an encryption unit encrypting said encrypted key delivery message, using an encrypted key other than the nth encrypted key;

said one of said plurality of wireless access terminal devices also comprising an updating unit updating an nth encrypted key stored and managed by said one of said plurality of wireless access terminal devices on reception of an nth encrypted key by said encrypted key delivery message from said wireless access point.

9. The updating system for an encrypted key for a wireless LAN as defined in claim 6 wherein:

said wireless access point comprises a generator unit generating an encrypted key delivery message on reception of an encrypted key addressed to said one of said plurality of wireless access terminal devices from said key management server device, and an encryption unit encrypting said encrypted key delivery message, using an initially updated one of k encrypted keys stored and managed by said wireless access point;

said one of said plurality of wireless access terminal devices also comprising an updating unit updating an nth encrypted key stored and managed by said one of said plurality of wireless access terminal devices on reception of an nth encrypted key by delivered said encrypted key delivery message from said wireless access point.

10. The updating system for an encrypted key for a wireless LAN as defined in claim 7 wherein said wireless access point comprises a generator unit generating an encrypted key delivery message on reception of an encrypted key addressed to said one of said plurality of wireless access terminal devices from said key management server device; and an encryption unit encrypting said encrypted key delivery message, using an encrypted key other than the nth encrypted key;

said one of said plurality of wireless access terminal devices also comprising an updating unit updating an nth encrypted key stored and managed by said one of said plurality of wireless access terminal devices on reception of said nth encrypted key by said encrypted key delivery message from said wireless access point.

11. The updating system for an encrypted key for a wireless LAN as defined in claim 7 wherein said wireless access point comprises:

a generator unit generating an encrypted key delivery message on reception of an encrypted key addressed to said one of said plurality of wireless access terminal devices from said key management server device, and an encryption unit encrypting said encrypted key delivery message, using an initially updated one of k encrypted keys stored and managed by said wireless access point;

said one of said plurality of wireless access terminal devices also comprising an updating unit updating an nth encrypted key stored and managed by said one of said plurality of wireless access terminal devices on reception of an nth encrypted key by delivered said encrypted key delivery message from said wireless access point.

12. An updating method for an encrypted key for a wireless LAN comprising:

(a) providing a wireless access point provided on a LAN, said wireless access point being wirelessly connected to a plurality of wireless access terminal devices and in which data is encrypted and transmitted between the wireless access point and the plurality of wireless access terminal devices;

(b) generating, by a key management server device, LAN-connected to said wireless access point, k encrypted keys, k being greater than 1, used for encrypted communication between said wireless access point and said plurality of wireless access terminal devices;

(c) storing and managing, by said key management server device the k encrypted keys;

(d) updating one of the encrypted keys under a preset condition, and (e) delivering the updated encrypted key to said wireless access point and to said plurality of wireless access terminal devices; and (f) each one of said wireless access point and said plurality of wireless access terminal devices decrypting wireless communications using said updated encrypted key.

13. The updating method for an encrypted key for a wireless LAN as defined in claim 12 wherein:

said key management server device in updating said k encrypted keys stored and managed by said key management server device sequentially updates said k encrypted keys at a rate of one-by-one at a preset time interval.

14. The updating method for an encrypted key for a wireless LAN as defined in claim 12 wherein:

where k is greater than 1, said key management server device sequentially updates all except a remaining one key (k−1) of said k encrypted keys stored in and managed by said key management server device one-by-one at a first preset interval, said key management server device updating the remaining one key at a second interval longer than said first preset interval.

15. The updating method for an encrypted key for a wireless LAN as defined in claim 12 wherein:

said key management server device in updating said k encrypted keys stored and managed by said key management server updates said k encrypted keys at a rate of one at a time.

16. The updating method for an encrypted key for a wireless LAN as defined in claim 15 wherein:

said wireless access point has encrypted communication with said plurality of wireless access terminal devices, sequentially using each one of k encrypted keys, other than an nth encrypted key stored in and managed by said wireless access point, during a period of time since updating of the nth encrypted key stored in and managed by said wireless access point until next updating of encrypted key, where $1 \leq n \leq k$.

17. The updating method for an encrypted key for a wireless LAN as defined in claim 15 wherein:

said wireless access point has encrypted communication with said plurality of wireless access terminal devices, using an initially updated one of k encrypted keys stored in and managed by said wireless access point.

18. The updating method for an encrypted key for a wireless LAN as defined in claim 15 wherein:

said wireless access point has encrypted communication with said plurality of wireless access terminal devices using another encrypted key other than an nth encrypted key stored in and managed by said wireless access point, during a period of time since updating of the nth encrypted key stored in and managed by said wireless access point until the another encrypted key is updated next, where $1 \leq n \leq k$.

19. The updating method for an encrypted key for a wireless LAN as defined in claim 18 wherein:

said plurality of wireless access terminal devices encrypt communication with said wireless access point, using one of said k encrypted keys, other than the nth encrypted key, stored in and managed by said plurality of wireless access terminal devices.

20. The updating method for an encrypted key for a wireless LAN as defined in claim 18 wherein:

said plurality of wireless access terminal devices communicate with said wireless access point, sequentially using each one of said k encrypted keys, other than the nth encrypted key, stored in and managed by said plurality of wireless access terminal devices.

21. The updating method for an encrypted key for a wireless LAN as defined in claim 18 wherein:

said plurality of wireless access terminal devices communicate with said wireless access point, using the last updated one of k encrypted keys stored in and managed by said plurality of wireless access terminal devices.

\* \* \* \* \*